United States Patent
Yamane et al.

(10) Patent No.: US 10,835,917 B2
(45) Date of Patent: Nov. 17, 2020

(54) COATING APPARATUS INCLUDING A BACKUP ROLL HAVING A LOWER CIRCUMFERENTIAL SURFACE ON WHICH A WEB TRAVELS IN A FRONT TO REAR DIRECTION AND HAVING A DIE THAT COATS THE WEB WITH COATING LIQUID

(71) Applicant: HIRANO TECSEED Co., Ltd., Kitakatsuragi-gun (JP)

(72) Inventors: Takaaki Yamane, Kitakatsuragi-gun (JP); Mitutaka Murata, Kitakatsuragi-gun (JP)

(73) Assignee: HIRANO TECSEED Co., Ltd., Kitakatsuragi-gun (JP)

( * ) Notice: Subject to any disclaimer, the term of this patent is extended or adjusted under 35 U.S.C. 154(b) by 0 days.

(21) Appl. No.: 16/165,373

(22) Filed: Oct. 19, 2018

(65) Prior Publication Data

US 2019/0118215 A1    Apr. 25, 2019

(30) Foreign Application Priority Data

Oct. 24, 2017   (JP) .................................. 2017-205578

(51) Int. Cl.
  *B05C 5/02*    (2006.01)
  *B29C 48/30*   (2019.01)
  *B05D 1/26*    (2006.01)

(52) U.S. Cl.
  CPC .......... *B05C 5/0245* (2013.01); *B05C 5/0254* (2013.01); *B05D 1/265* (2013.01);
  (Continued)

(58) Field of Classification Search
  CPC .. B05C 5/0254; B05C 11/1005; B05C 5/0245
  (Continued)

(56) References Cited

U.S. PATENT DOCUMENTS

| 4,675,230 A | 6/1987 | Innes |
| 5,147,462 A * | 9/1992 | Wollam ............... B05C 5/0254 |
| | | 118/126 |

(Continued)

FOREIGN PATENT DOCUMENTS

JP    1-99664    4/1989

OTHER PUBLICATIONS

Extended European Search Report dated Apr. 3, 2019 in corresponding European Patent Application No. 18200670.0 citing documents AA-AC therein, 8 pages.

*Primary Examiner* — Karl Kurple
(74) *Attorney, Agent, or Firm* — Oblon, McClelland, Maier & Neustadt, L.L.P.

(57) ABSTRACT

According to one embodiment, a coating apparatus includes a backup roll, a die disposed below the backup roll, a bending device disposed below the die, and a die pressing module provided on an upper surface of the bending device. The die includes a base module, a first body erected from a rear part of an upper surface of the base module, a second body combined with a front surface of the first body, a mount space formed between a front part of the upper surface of the base module and a lower surface of the second body, a liquid storage module for a coating liquid, a liquid passage for the coating liquid, a slit-like discharge port for the coating liquid, and a shim sandwiched between the first body and the second body.

8 Claims, 4 Drawing Sheets

(52) U.S. Cl.
CPC ............. *B29C 48/30* (2019.02); *Y10S 118/02* (2013.01); *Y10T 29/49115* (2015.01)

(58) Field of Classification Search
USPC .................................................... 118/DIG. 2
See application file for complete search history.

(56) References Cited

U.S. PATENT DOCUMENTS

| | | | | |
|---|---|---|---|---|
| 5,558,716 | A * | 9/1996 | Mitani | B05C 5/0254 118/410 |
| 6,033,723 | A * | 3/2000 | Kistler | B05C 1/083 118/249 |
| 6,068,700 | A * | 5/2000 | Naruse | B05C 5/00 118/123 |
| 6,139,639 | A * | 10/2000 | Kitamura | B05C 5/0208 118/680 |
| 2002/0022092 | A1 | 2/2002 | Yoshida | |
| 2003/0205201 | A1 * | 11/2003 | Shida | H01M 4/0404 118/696 |
| 2007/0092655 | A1 * | 4/2007 | Tokimasa | B05C 5/0254 427/355 |
| 2007/0248745 | A1 * | 10/2007 | Wakai | B05C 11/1005 427/10 |
| 2011/0097476 | A1 * | 4/2011 | Ishizu | B05C 5/0254 427/8 |
| 2012/0315378 | A1 * | 12/2012 | Yapel | B05C 5/0262 427/8 |
| 2013/0183438 | A1 * | 7/2013 | Suzuki | B05C 5/0254 427/58 |
| 2018/0207668 | A1 * | 7/2018 | Rutz | B05B 13/0207 |

\* cited by examiner

COATING APPARATUS INCLUDING A BACKUP ROLL HAVING A LOWER CIRCUMFERENTIAL SURFACE ON WHICH A WEB TRAVELS IN A FRONT TO REAR DIRECTION AND HAVING A DIE THAT COATS THE WEB WITH COATING LIQUID

CROSS-REFERENCE TO RELATED APPLICATIONS

This application is based upon and claims the benefit of priority from the prior Japanese Patent Application No. 2017-205578, filed on Oct. 24, 2017; the entire contents of which are incorporated herein by reference.

FIELD

Embodiments of the present invention relate to a coating apparatus that coats a web with a coating liquid.

BACKGROUND

There is a conventionally proposed coating apparatus that discharges a coating liquid to a web from an upper end of a die placed below a backup roll for carrying the web. When the web is coated using the die, the interval between the backup roll and the tip of the die is increased by the pressure of the coating liquid toward the middle in the left-right direction.

Accordingly, a bending device is provided below the die and a die pressing module of the bending device presses a part of the lower surface of the die in the middle in the left-right direction to make the interval in the left-right direction between the backup roll and the die constant (see JP-B-5-23836 (KOKAI)).

When a bending device is provided below the die as described above, the point in the die pressed by the die pressing module of the bending device is preferably located in the middle in the left-right direction of the die and immediately below the discharge port of the die. In the structure in which the front part and the rear part are separated from each other as a conventional die, since a discharge port is present in the separation part, there is a problem in that the die pressing module of the bending device cannot be disposed immediately below the discharge port.

Accordingly, an embodiment of the invention addresses the above problem with an object of providing a coating apparatus in which the die pressing module of the bending device can be disposed immediately below the discharge port of the die.

DETAILED DESCRIPTION

According to one embodiment, a coating apparatus includes a backup roll having a lower circumferential surface on which a web travels in a front-rear direction; a die disposed below the backup roll; a bending device disposed below the die; a die pressing module provided on an upper surface of the bending device and pressing a lower surface of the base module. The die includes a base module, a first body erected from a rear part of an upper surface of the base module integrally with the rear part, the first body having a triangular cross section in an upper part thereof, a second body combined with a front surface of the first body, the second body having a triangular cross section in an upper part thereof, a mount space formed between a front part of the upper surface of the base module and a lower surface of the second body, a liquid storage module for a coating liquid, the liquid storage module being provided in the first body or the second body, a liquid passage for the coating liquid, the liquid passage extending from the liquid storage module to a part between the first body and the second body, a slit-like discharge port for the coating liquid, the discharge port being provided at an upper end of the liquid passage, and a shim sandwiched between the first body and the second body.

According to the embodiment of the invention, the die pressing module of the bending device can be disposed in a part of the lower surface of the base module immediately below the discharge port of the die.

A coating apparatus 10 for a web W according to the embodiment of the invention will be described with reference to FIGS. 1 to 4. The web W is a long member such as a film, metal plate, mesh metal, paper, or cloth.

(1) Entire Structure of the Coating Apparatus 10

The entire structure of the coating apparatus 10 will be described with reference to FIGS. 1 to 3. The coating apparatus 10 includes a backup roll 12, a die 14, and a bending device 8.

Figure 1:
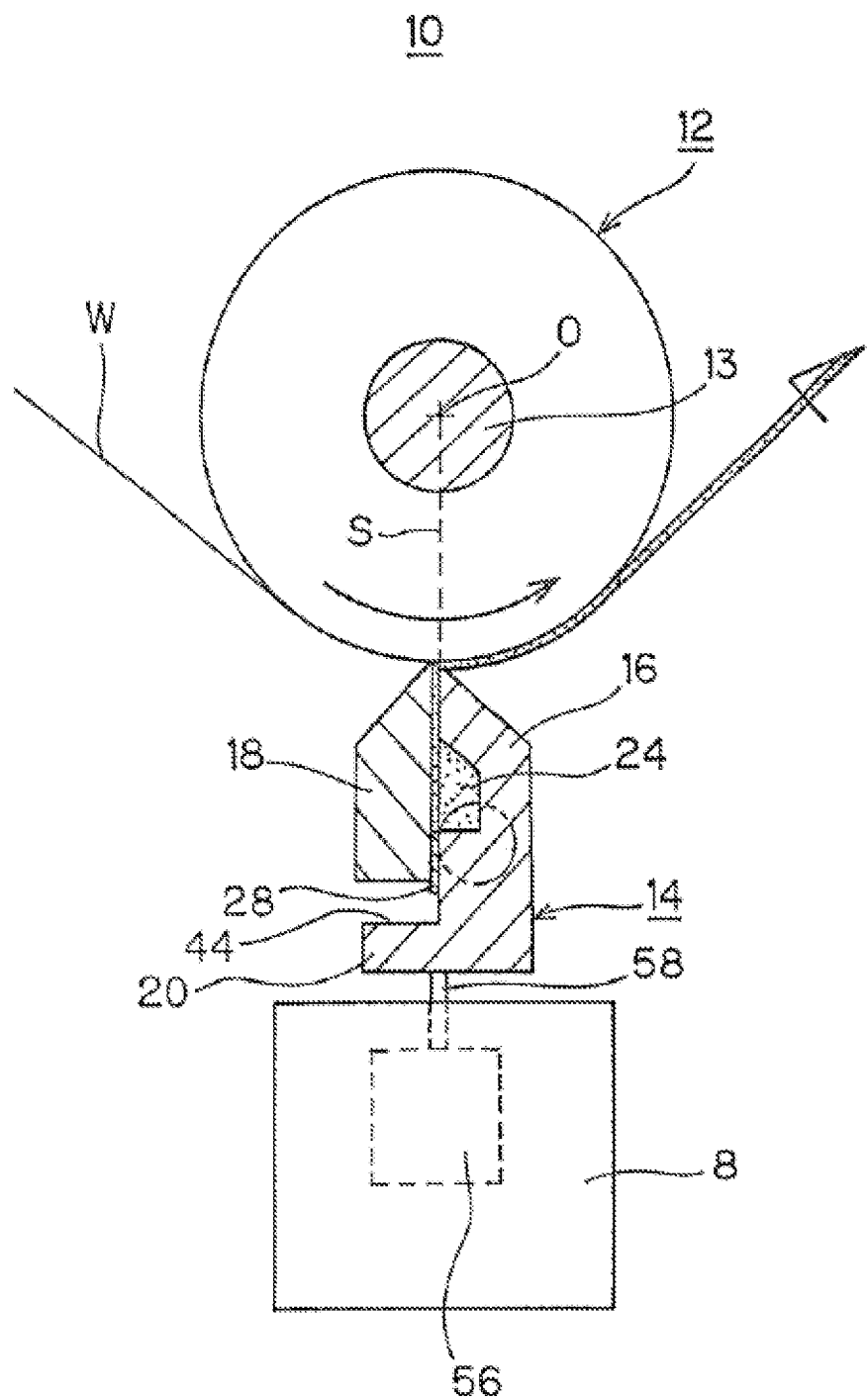
FIG. 1 is a longitudinal sectional view illustrating a part of a coating apparatus according to an embodiment of the invention.

As illustrated in FIG. 1, the backup roll 12 rotates counterclockwise about a center O of a horizontal rotary shaft 13 and the web W travels on a lower circumferential surface thereof in the front-rear direction (from left to right in FIG. 1, that is, from upstream to downstream).

Figure 2:
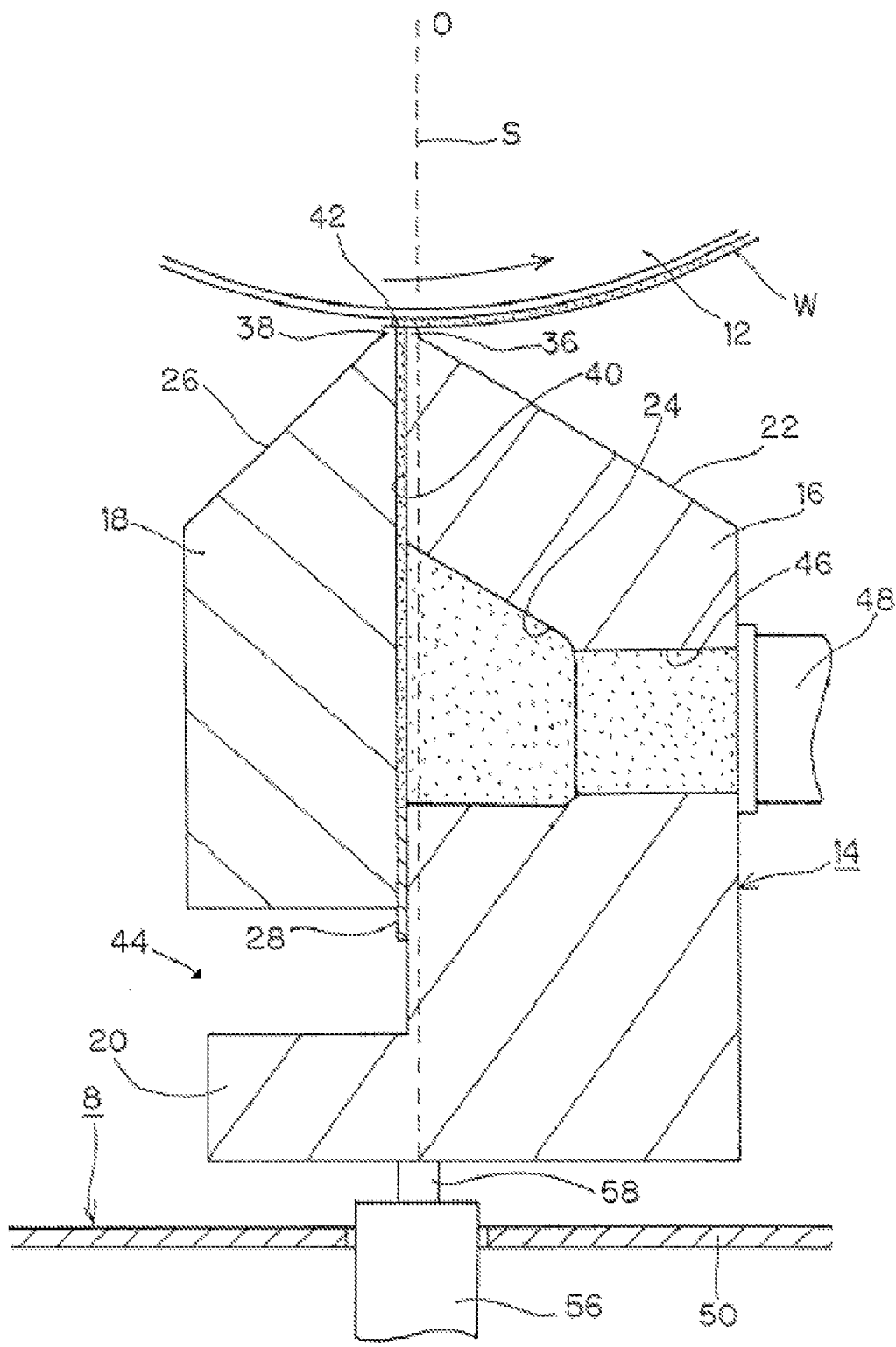
FIG. 2 is an enlarged longitudinal sectional view illustrating a die.

As illustrated in FIGS. 1 and 2, the die 14 is provided below the backup roll 12. The die 14 includes a first body 16, a second body 18, a base module 20, and a mount space 44, as illustrated in FIGS. 1 and 2.

The base module 20 is a rectangular parallelepiped extending in the left-right direction and the first body 16 is erected from the rear part of the upper surface integrally with the rear part, as illustrated in FIGS. 1 and 2.

Figure 3:
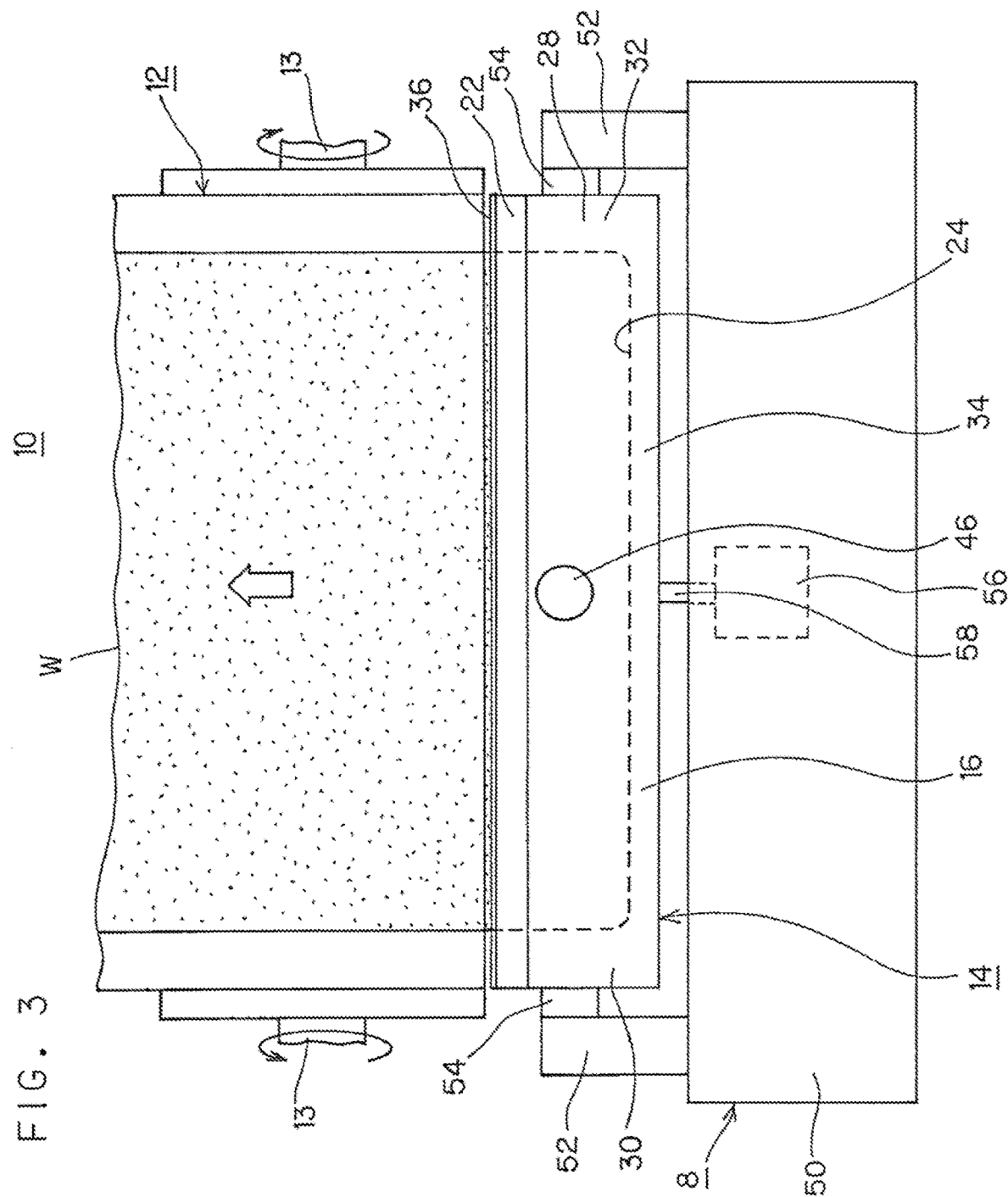
FIG. 3 is a front view illustrating the coating apparatus.

The first body 16 is a rectangular parallelepiped extending in the left-right direction, has a first inclined surface 22 formed from the upper end part of the front surface toward the upper end part of the rear surface, and has a triangular cross section in the upper part thereof, as illustrated in FIGS. 1 to 3. The front surface of the first body 16 is a vertical surface and has a liquid storage module 24 formed in the left-right direction, as illustrated in FIG. 3. The tip in the upper part of the first body 16 is provided with a first coating projecting module (first coating blade module) 36 that is a rectangular parallelepiped extending in the left-right direction and having a planar upper surface.

The second body 18 is disposed in front of the first body 16 (that is, above the base module 20), is a rectangular parallelepiped extending in the left-right direction, and has a dimension in the vertical direction smaller than the first body 16, as illustrated in FIGS. 1 and 2. A second inclined surface 26 is formed from the upper end part of the front surface toward the upper end part of the rear surface of the second body 18. The tip of the upper part of the second body 18 is provided with a second coating projecting module (second coating blade module) 38 that is a rectangular parallelepiped extending in the left-right direction and having a planar upper surface.

The mount space 44 is formed between the second body 18 and the base module 20. This mount space 44 has an upper surface formed by the lower surface of the second body 18, a lower part formed by the upper surface of the base module 20, a front surface that is opened, a rear surface formed by the front surface of the first body 16, and left and right sides that are opened.

A planar shim 28 is sandwiched between the front surface of the first body 16 and the rear surface of the second body 18, as illustrated in FIGS. 1 to 3. The shim 28 includes left and right peripheral parts 30 and 32 and a lower peripheral part 34 of the liquid storage module 24, as illustrated in FIG. 3.

The first body 16, the second body 18, and the shim 28 are fixed integrally with each other by a tightening bolt (not illustrated). When they are fixed integrally, a triangle is formed by the first inclined surface 22 and the second inclined surface 26 as illustrated in FIGS. 1 and 2. The upper surface of the first coating projecting module 36 and the upper surface of the second coating projecting module 38 have the same height and the lower circumferential surface of the backup roll 12 is positioned above these upper surfaces with a coating interval left.

A liquid passage 40 is formed vertically between the first body 16 and the second body 18 above the liquid storage module 24 and a slit-like discharge port 42 is formed in the upper end part thereof. That is, the slit-like discharge port 42 is positioned between the upper end parts of the first coating projecting module 36 and the second coating projecting module 38. Both sides of the liquid passage 40 are closed by the left and right peripheral parts 30 and 32 of the shim 28 and the lower part is closed by the lower peripheral part 34.

A supply port 46 for the coating liquid penetrates in the middle in the left-right direction of the rear surface of the liquid storage module 24 provided in the first body 16 as illustrated in FIGS. 2 and 3 and a hose 48, which is connected from a pump (not illustrated) for supplying the coating liquid, is connected to the supply port 46.

The bending device 8 is substantially a rectangular parallelepiped provided below the die 14 and a pair of arm modules 52 is erected from the left and right sides of the upper surface. On the other hand, a pair of left and right support shafts 54 and 54 projects from both side surfaces of the first body 16 and is rotatably supported by the pair of left and right arm modules 52. This causes the die 14 to be disposed rotatably above a bending device body 50 of the bending device 8 and to be fixed in a particular position.

An up-down moving module 56 is provided in the bending device body 50 and a cylindrical die pressing module 58 is provided in the upper end part of the up-down moving module 56. A cotter included in the up-down moving module 56 moves horizontally to move the die pressing module 58 up and down.

(2) Positional Relationship Between Individual Devices

The positional relationship between the backup roll 12 and the die 14 will be described. As illustrated in FIGS. 1 and 2, when a perpendicular line S is drawn downward from the center O of the rotary shaft 13 of the backup roll 12, the perpendicular line S passes through the rear surface of the first coating projecting module 36 of the first body 16 of the die 14. This makes the upper surface of the first coating projecting module 36 closest to the lower circumferential surface of the backup roll 12. As illustrated in FIG. 2, the surface of the web W is coated with the coating liquid discharged from the discharge port 42 by the backup roll 12 that rotates counterclockwise. The interval between the first coating projecting module 36 and the web W travelling on the backup roll 12 is a coating clearance.

Next, the positional relationship between the discharge port 42 and the die pressing module 58 will be described. The die pressing module 58 is disposed on the lower surface of the base module 20 so that the perpendicular line S drawn downward from the center O of the rotary shaft 13 of the backup roll 12 passes through the center of the cylindrical die pressing module 58.

(3) Operating State of the Coating Apparatus 10

Next, the operating state of the coating apparatus 10 will be described with reference to FIGS. 1 to 4. As illustrated in FIG. 1, the web W on the lower circumferential surface is moved from front to rear (from upstream to downstream) by rotating the backup roll 12 counterclockwise.

The coating liquid is supplied to the liquid storage module 24 of the die 14 disposed below the backup roll 12 from a pump (not illustrated) via the hose 48 and the supply port 46. The coating liquid having been supplied to the liquid storage module 24 climbs through the liquid passage and is discharged from the discharge port 42. The discharged coating liquid coats the surface of the web W travelling on the lower circumferential surface of the backup roll 12. The state at this time will be described in more detail.

First, the first inclined surface 22 and the second inclined surface 26 of the die 14 form a triangle and the first coating projecting module 36 and the second coating projecting module 38 are provided as the upper end part thereof. Since the first coating projecting module 36 and the second coating projecting module 38 look like lips projecting upward, they are referred to as a lip type upper end. This lip type upper end can be used for coating. However, since the lower circumferential surface of the backup roll 12 is arc-shaped and the upper surface of the first coating projecting module 36 and the upper surface of the second coating projecting module 38 are planar, coating with the same coating pressure and the same coating thickness cannot be performed in the entire area of the upper surface of the first coating projecting module 36 and the upper surface of the second coating projecting module 38 even at the same height.

Figure 4:
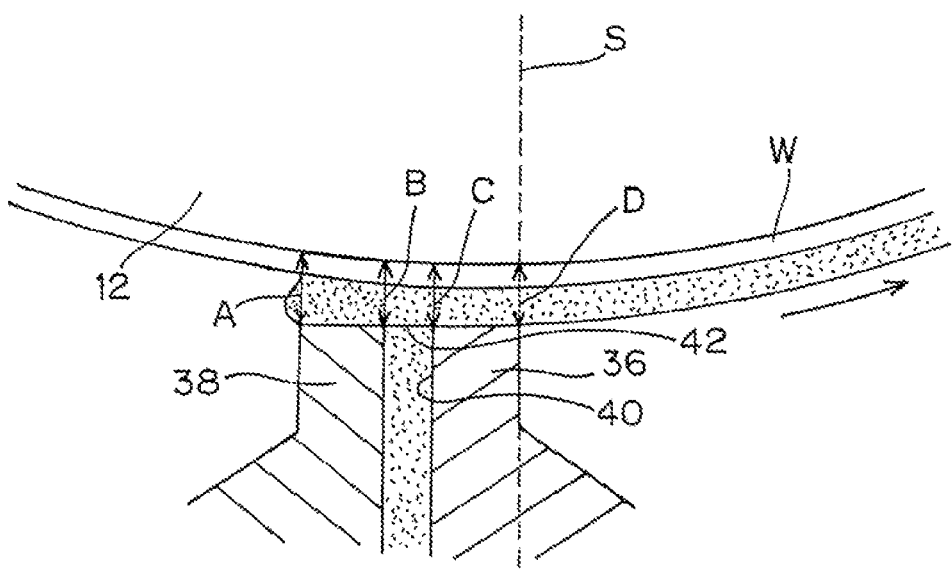
FIG. 4 is an enlarged longitudinal sectional view illustrating a coated part.

Therefore, the rear part of the upper surface of the first coating projecting module 36 downstream of the second coating projecting module 38 is positioned immediately below the center O of the rotary shaft 13 in the embodiment. This minimizes the interval between the rear part of the upper surface of the first coating projecting module 36 and the lower circumferential surface of the backup roll 12 and the largest coating pressure is applied in this position. Accordingly, coating is performed in this position in which the largest coating pressure is applied. That is, the interval between the rear part of the upper surface of the first coating projecting module 36 and the lower circumferential surface of the backup roll 12 becomes the coating interval and the coating thickness is determined. In particular, since the upper surface of the first coating projecting module 36 and the upper surface of the second coating projecting module 38 are set to the same height, the web W can travel smoothly and A>B>C>D holds when the interval between the front part of the upper surface of the second coating projecting module 38 and the lower circumferential surface of the backup roll 12 is A, the interval between the rear part of the upper surface of the second coating projecting module 38 and the lower circumferential surface is B, the interval between the front part of the upper surface of the first coating projecting module 36 and the lower circumferential surface is C, and the interval between the rear part of the upper surface of the first coating projecting module 36 and the lower circumferential surface is D as illustrated in FIG. 4. Accordingly, the coating pressure applied to the web W gradually increases and coating can be performed in the position corresponding to the interval D in which the coating pressure is maximized.

On the other hand, the upper end part of the die 14 closer to the middle in the left-right direction is bent downward more by the pressure of the coating liquid discharged from the discharge port 42. The die pressing module 58 of the bending device 8 presses the lower surface of the base module 20 of the die 14 to prevent this bending. In the embodiment, the pressing position by the die pressing module 58 is the position in the middle in the left-right direction and immediately below the center O of the rotary shaft 13 of the backup roll 12 in the front-rear direction as illustrated in FIG. 2. The reason why the position immediately below the center O of the rotary shaft 13 of the backup roll 12 is pressed will be described. As described above, when the rear part of the upper surface of the first coating projecting module 36 is positioned immediately below the center O of the rotary shaft 13 of the backup roll 12, the interval between the rear part of the upper surface of the first coating projecting module 36 and the lower circumferential surface of the backup roll 12 is minimized and the largest coating pressure is applied in this closest position. Accordingly, bending is likely to be caused in this part in the front-rear direction. Therefore, in the embodiment, the position immediately below the center O (the rear part of the upper surface of the first coating projecting module 36) of the rotary shaft 13 of the backup roll 12 is pressed to prevent the bending.

In addition, by bending the base module 20 and the first body 16, the second body 18 fixed to the first body 16 can also be bent at the same time.

(4) Effects

Since the first body 16 and the base module 20 are formed integrally with each other in the embodiment, the die 14 can be bent by pressing the lower surface of the base module 20 using the die pressing module 58 of the bending device 8. Since the first body 16 is erected from the rear part of the base module 20 at this time, the center of the die pressing module 58 can be positioned immediately below (immediately below the center O of the rotary shaft 13 of the backup roll 12) the rear surface of the first coating projecting module 36 as illustrated in FIG. 2 and the part (in the left-right direction and in the front-rear direction) in which the largest coating pressure is applied can be bent.

In addition, since the first body 16 and the second body 18 are fixed integrally with each other by a tightening bolt and the second body 18 is smaller that the first body 16, the second body 18 can also be bent at the same time by bending the first body 16. In particular, since the mount space 44 is provided between the base module 20 and the second body 18, the second body 18 can be bent.

(5) Modification

The structure for pressing the die pressing module 58 of the bending device 8 is not limited to the cotter in the embodiment and may be another structure. For example, the up-down moving module 56 may have a motor or actuator for moving the die pressing module 58 up and down.

In addition, although the liquid storage module 24 is provided in the first body 16 in the embodiment, the liquid storage module 24 may be provided in the second body 18 instead.

Although embodiments of the invention have been described above, the embodiments are only examples and not intended to limit the scope of the invention. These novel embodiments may be embodied in variety of other forms and various omissions, substitutions, and changes may be made without departing from the spirit of the invention. These embodiments and their modifications are included in the scope and spirit of the invention and included in the invention designated in the appended claims and equivalent scope of the invention.

What is claimed is:
1. A coating apparatus comprising:
a backup roll having a lower circumferential surface on which a web travels in a front to rear direction;
a die disposed below the backup roll, the die including
a base module,
a first body erected from a rear part of an upper surface of the base module, wherein said first body is formed integrally with the rear part of the upper surface of the base module, the first body having a triangular cross section in an upper part thereof,
a second body combined with a front surface of the first body, the second body having a triangular cross section in an upper part thereof,
a mount space formed between a front part of the upper surface of the base module and a lower surface of the second body,
a liquid storage module for a coating liquid, the liquid storage module being provided in the first body or the second body,
a liquid passage for the coating liquid, the liquid passage extending from the liquid storage module to an upper end part of the first body and the second body,
a discharge port for the coating liquid, the discharge port being provided at an upper end of the liquid passage, and
a shim sandwiched between the first body and the second body, wherein the shim includes a left peripheral part and a right peripheral part which closes sides of the liquid passage and a lower peripheral part of the shim closes the lower part of the liquid passage, and the shim extends into a portion of the mount space adjacent to the front surface of the first body;
a bending device disposed below the die,
wherein a first coating projecting module is formed at a tip of the upper part of the first body,
a second coating projecting module is formed at a tip of the upper part of the second body,
the discharge port is opened between the first coating projecting module and the second coating projecting module;
a die pressing module provided on an upper surface of the bending device, the die pressing module presses a lower surface of the base module when the web is coated, and a perpendicular line from the center of a rotary shaft of the backup roll passes through a rear part of the first coating projecting module, the base module, and the center of the die pressing module.

2. The coating apparatus according to claim 1, wherein the base module is a rectangular parallelepiped extending in a left to right direction.

3. The coating apparatus according to claim 2, wherein the mount space has an upper surface formed by the lower surface of the second body, a lower surface formed by the upper surface of the base module, a rear surface formed by the front surface of the first body, a front opening that is directly opposite to the rear surface, and a left side and a right side that are opened.

4. The coating apparatus according to claim 1, wherein the first coating projecting module has a planar upper surface, and
the second coating projecting module has a planar upper surface.

5. The coating apparatus according to claim 4, wherein the upper surface of the first coating projecting module and the upper surface of the second coating projecting module have a same height.

6. The coating apparatus according to claim 1, wherein a supply port through which the coating liquid is supplied to the liquid storage module is opened in the middle in a left to right direction of the first body or the second body.

7. The coating apparatus according to claim 1, wherein a pair of left and right support shafts projects from left and right surfaces of the first body, and
the pair of left and right support shafts is supported by a pair of left and right arm modules erected from the bending device.

8. The coating apparatus according to claim 7, wherein the die is rotatable about a pair of left and right support shafts.

* * * * *